(12) United States Patent
Grieshaber

(10) Patent No.: US 9,175,576 B2
(45) Date of Patent: Nov. 3, 2015

(54) TURBOMACHINE

(75) Inventor: Dirk Grieshaber, Wesel (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 807 days.

(21) Appl. No.: 13/376,655

(22) PCT Filed: Jun. 2, 2010

(86) PCT No.: PCT/EP2010/057674
§ 371 (c)(1),
(2), (4) Date: Dec. 7, 2011

(87) PCT Pub. No.: WO2010/142584
PCT Pub. Date: Dec. 16, 2010

(65) Prior Publication Data
US 2012/0082546 A1  Apr. 5, 2012

(30) Foreign Application Priority Data
Jun. 9, 2009 (EP) .................................. 09007625

(51) Int. Cl.
F04D 29/10 (2006.01)
F01D 11/04 (2006.01)
F02C 7/28 (2006.01)
F16J 15/34 (2006.01)

(52) U.S. Cl.
CPC . *F01D 11/04* (2013.01); *F02C 7/28* (2013.01); *F16J 15/342* (2013.01); *F05D 2220/31* (2013.01)

(58) Field of Classification Search
USPC ....................................... 415/229, 230, 168.2
See application file for complete search history.

(56) References Cited

U.S. PATENT DOCUMENTS

| 1,876,515 | A | | 9/1932 | Emmet |
| 1,895,003 | A | * | 1/1933 | Meyer ............................. 415/48 |
| 3,917,289 | A | | 11/1975 | Goritsky |
| 5,137,284 | A | * | 8/1992 | Holder .......................... 277/390 |
| 6,325,382 | B1 | * | 12/2001 | Iwamoto et al. ............... 277/368 |
| 2007/0147988 | A1 | * | 6/2007 | Ito et al. ..................... 415/169.1 |

FOREIGN PATENT DOCUMENTS

| DE | 361237 A1 | 8/1987 |
| DE | 3619489 A1 | 12/1987 |
| GB | 805980 A | 12/1958 |
| GB | 2167141 A | 5/1986 |
| JP | 52085608 | 7/1977 |

(Continued)

Primary Examiner — Dwayne J White
Assistant Examiner — Justin Seabe

(57) ABSTRACT

A turbomachine, particularly a steam turbine, is provided. The turbomachine includes a machine housing and a shaft, which is guided through and guided out of the machine housing, at least on one side, wherein at least one annular gap present between the shaft and the machine housing is sealed by way of a shaft sealing assembly, wherein the shaft sealing assembly includes at least one radial double seal having two pairs of sealing surface pairs, which are spaced apart substantially radially and between which an annular sealing liquid chamber is formed, which can be supplied with sealing liquid via a sealing liquid feed line, wherein each sealing surface pair has an annular rotating sealing surface and an annular non-rotating sealing surface, which are arranged substantially axially opposite of each other and prestressed with respect to each other.

8 Claims, 5 Drawing Sheets

(56) References Cited

FOREIGN PATENT DOCUMENTS

| | | |
|---|---|---|
| JP | 55175665 | 12/1980 |
| JP | 63135093 | 6/1988 |
| JP | 3017476 U | 1/1991 |
| JP | 1078387 | 3/1998 |
| WO | WO 9927281 A1 | 6/1999 |

* cited by examiner

TURBOMACHINE

CROSS REFERENCE TO RELATED APPLICATIONS

This application is the U.S. National Stage of International Application No. PCT/EP2010/057674, filed Jun. 2, 2010 and claims the benefit thereof. The International Application claims the benefits of European Patent Office application No. 09007625.8 EP filed Jun. 9, 2009. All of the applications are incorporated by reference herein in their entirety.

FIELD OF INVENTION

The present invention refers to a turbomachine, especially to a steam turbine, comprising a machine housing and a shaft which is guided through this and guided out of this at least on one side, wherein at least one annular gap, which exists between the shaft and the machine housing, is sealed via a shaft seal arrangement.

BACKGROUND OF INVENTION

Such turbomachines are known in the prior art in the widest variety of developments. A pressure, which lies below or above the atmospheric pressure of the turbine environment, prevails inside the machine housing, depending upon the type of turbomachine. A basic problem with turbomachines is that the annular gap which exists between the shaft and the machine housing cannot be completely sealed on account of the relative movement between the shaft surface and the adjacent machine-housing surfaces. This leads to environmental fluid being able to penetrate into the interior of the machine housing, for example in the case of steam turbines with exhaust steam pressures below atmospheric pressure, which leads to an adverse effect in the operation and efficiency of the steam turbine. In the case of compressors or gas turbines, in which the machine-housing internal pressure is higher than the machine-housing ambient pressure, the process fluid, however, can escape from the interior of the machine housing into the machine-housing environment, which has a negative effect upon the thermal efficiency of the turbomachine.

A turbomachine in the form of a steam turbine with a conventional shaft seal arrangement is subsequently described with reference to FIGS. 1, 2 and 3, wherein FIG. 1 shows a schematic view of the steam turbine, FIG. 2 is a schematic view of a rear seal shell of the machine housing of the steam turbine which is shown in FIG. 1 and has a conventional shaft seal arrangement, and FIG. 3 schematically shows the pressures which prevail in the shaft seal arrangement which is shown in FIG. 2.

The steam turbine 100 comprises a machine housing 102 through which extends a shaft 104 which is guided out of the machine housing 102 on both sides. The machine housing 102 is provided with a front seal shell 106 and a rear seal shell 108, wherein the rear seal shell 108 presently undertakes the task of sealing the pressure chamber 110, which is defined inside the machine housing 102, in relation to the machine-housing environment. Live steam is fed to the pressure chamber 110 of the steam turbine 100 via a feed line 112 which is provided with an emergency stop valve 114 and a control valve 116 which are in series in the flow direction. After expansion of the steam in the steam turbine 100, the exhaust steam, via an exhaust line 118, is fed to a condensing plant 124, which is provided with a cooling device 120 and is functionally connected to an evacuation device 122, and is condensed there.

The resulting condensate is conducted out of the condensing plant 124 via a line 126.

For sealing the annular gap 125 which exists between the shaft 104 and the rear seal shell 108, the rear seal shell 108, which is installed in the machine housing 102 in a fixed manner and with sealing effect or together with the machine housing 102 forms a constructional unit, is provided with a shaft seal arrangement 128, as is shown in FIG. 2. Starting from the pressure chamber 110, the shaft seal arrangement 128 comprises at least three consecutive sealing modules, specifically an inner labyrinth seal 130, a middle labyrinth seal 132 and an outer labyrinth seal 134, which seal the annular gap 125.

During operation of the steam turbine 100, exhaust steam, under an exhaust steam pressure $p_{AD}$, is present in the rear exhaust steam region 138 of the machine housing 102. Air under an ambient pressure $p_U$, which lies above the exhaust steam pressure $p_{AD}$, is present outside the machine housing 102. From the exhaust steam region 138, seal steam under the seal steam pressure $p_{SD}$ is introduced into the annular gap 125, via a seal steam feed line 140, between the inner labyrinth seal 130 and the middle labyrinth seal 132, the seal steam pressure $p_{SD}$ lying slightly above the ambient pressure $P_U$. In this case, the seal steam pressure $p_{SD}$ and also the temperature of the seal steam must be accurately regulated or adjusted in order to avoid leakages or damage as a result of overheating or condensate on the rear seal shell 108 and on the shaft 104. The pressure gradient of the seal steam reduces in the direction of the exhaust steam region 138 across the inner labyrinth seal 130 to the pressure level of the exhaust steam pressure $P_{AD}$ and in the direction of the environment reduces across the middle labyrinth seal 132 to the leak-off steam pressure $p_{WD}$ which prevails between the middle labyrinth seal 132 and the outer labyrinth seal 134, wherein the leak-off steam pressure $p_{WD}$, contingent upon the exhaust stack draft in the leak-off steam discharge line 142, lies slightly below the machine-housing ambient pressure $p_U$. Depending upon the level of the seal steam pressure $p_{SD}$ which is supplied via the seal steam feed line 140, it is also conceivable that the seal steam pressure $p_{SD}$, for constructional reasons, does not fully reduce across the middle labyrinth seal 132 to the level of the ambient pressure $p_U$ and steam escapes to the outside via the outer labyrinth seal 134. In order to prevent this, further labyrinth seals, with leak-off steam discharge lines in between, can be optionally connected downstream, which is not shown in FIG. 2, however. Alternatively, a condensing plant (not shown either) can be connected downstream to the leak-off steam discharge line 142 for supporting the suction action. Depending upon the accumulating amount of condensate, condensate drains 144 can be provided between the individual labyrinth seals 130, 132, 134, wherein in FIG. 2 only one condensate drain 144 between the middle labyrinth seal 132 and the outer labyrinth seal 134 is shown.

One problem with the arrangement shown in FIG. 2 is that the use of seal steam as seal fluid results in a very complex and expensive construction, which is to be attributed in particular to the complex controlling of the seal steam and to the provision of the leak-off steam discharge line.

A further turbomachine is disclosed in DE-A-36 12 327.

SUMMARY OF INVENTION

Starting from this prior art, it is therefore an object of the present invention to create a turbomachine, especially a steam turbine of the type referred to in the introduction, in which the use of seal steam as seal fluid can be completely dispensed with without resulting in losses with regard to the leaktightness of the shaft seal arrangement and to the operational reliability.

For achieving this object, the present invention creates a turbomachine, especially a steam turbine, comprising a machine housing and a shaft which is guided through this and guided out of this at least on one side, wherein at least one annular gap, which exists between the shaft and the machine housing, is sealed via a shaft seal arrangement, wherein the shaft seal arrangement comprises at least one radial double seal with two essentially radially spaced apart sealing-surface pairs, between which is formed an annular seal-fluid chamber which, via a seal-fluid feed line, can be pressurized with a gaseous seal fluid under pressure in such a way that the radial double seal has a positive pressure difference on both sides at any operating point, wherein each sealing-surface pair has an annular rotating sealing surface and an annular non-rotating sealing surface which are arranged essentially axially opposite each other and are pretensioned against each other.

A significant advantage of the turbomachine according to the invention is that a seal steam supply as seal steam fluid can be completely dispensed with since the pressure difference is reduced across the radial double seal compared with the conventional shaft seal arrangement which is shown in FIG. 2. Accordingly, the entire seal supply as well as the leak-off steam discharge line are dispensed with, which leads to a cost-effective construction of the turbomachine according to the invention. Furthermore, the turbomachine according to the invention has very high efficiency on account of the non-existent seal steam supply. The radial double seal creates a pressure gradient of the incoming seal fluid—which for example can be provided in the form of air or nitrogen—on both sides, which is why the pressure in the exhaust steam region of the machine housing can be dropped below the machine-housing ambient pressure. On account of the very small sealing gap, which is defined by the radial double seal, the inwardly directed leakage of the introduced seal fluid is very low in comparison to the air leakage quantities for which the evacuation device 122, shown in FIG. 1, of the condensing plant 124 with a conventional shaft seal arrangement 128 is designed. Furthermore, the radial double seal can be monitored directly via the feed of the seal fluid.

Preferably, the non-rotating sealing surfaces are provided on a common, non-rotating sealing-surface carrier and/or the rotating sealing surfaces are provided on a common rotating sealing-surface carrier. In this way, the construction of the turbomachine according to the invention can be greatly simplified.

The non-rotating sealing surfaces are advantageously pretensioned via a spring force in the direction of the rotating sealing surfaces. In this way, the construction of the rotor which is exposed to centrifugal force is of a less complicated design. The spring force can be provided via a spring element, or via a plurality of spring elements, for example.

The sealing-surface pairs are advantageously arranged coaxially to the shaft, as a result of which a simpler and more space-saving construction is produced.

The pressurizing of the radial double seal with the seal fluid is selected in such a way that the radial double seal has a positive pressure difference on both sides at any operating point so that a stable fluid film is constantly produced between the opposite sealing surfaces of the sealing-surface pairs.

Towards the outside, in relation to the radial double seal, provision is made for at least one outer additional shaft seal, and/or inwardly, in relation to the radial double seal, provision is made for at least one inner additional shaft seal, wherein the additional shaft seals can be designed in the form of a labyrinth seal, for example. In this way, it is ensured that in the event of damage to the radial double seal the ingress of air into the condenser is limited and therefore an emergency operation or at least a controlled shutdown of the turbomachine is possible.

The partitioning of the radial double seal by means of at least one outer additional shaft seal is particularly effective since an interspace between the radial double seal and the at least one outer additional shaft seal can be pressurized with a separation fluid. This separation fluid can be a filtered environmental medium, such as air. Such an arrangement is particularly advantageous when outside of the entire shaft seal arrangement provision is made for an oil reservoir, for example, from which escaping oil mist can find its way into the shaft seal arrangement and possibly create hazardous fluid mixtures.

Provision is also advantageously made for at least one fluid drain line which is preferably arranged between the at least one inner additional shaft seal and the radial double seal.

According to one embodiment of the present invention the turbomachine is a steam turbine, wherein the shaft seal arrangement is provided on a rear seal shell of the machine housing, which seal shell is preferably installed in the machine housing in a fixed manner and with sealing effect, or forms a constructional unit with the machine housing.

Alternatively or additionally, the shaft seal arrangement, corresponding to the constructional and thermodynamic requirements of the turbomachine, can also be provided on the front seal shell 106.

BRIEF DESCRIPTION OF THE DRAWINGS

Further features and advantages of the present invention are explained on the basis of the subsequent description of an embodiment of a turbomachine according to the invention in the form of a steam turbine with reference to the attached drawing. In the drawing

DETAILED DESCRIPTION OF INVENTION

Figure 1:
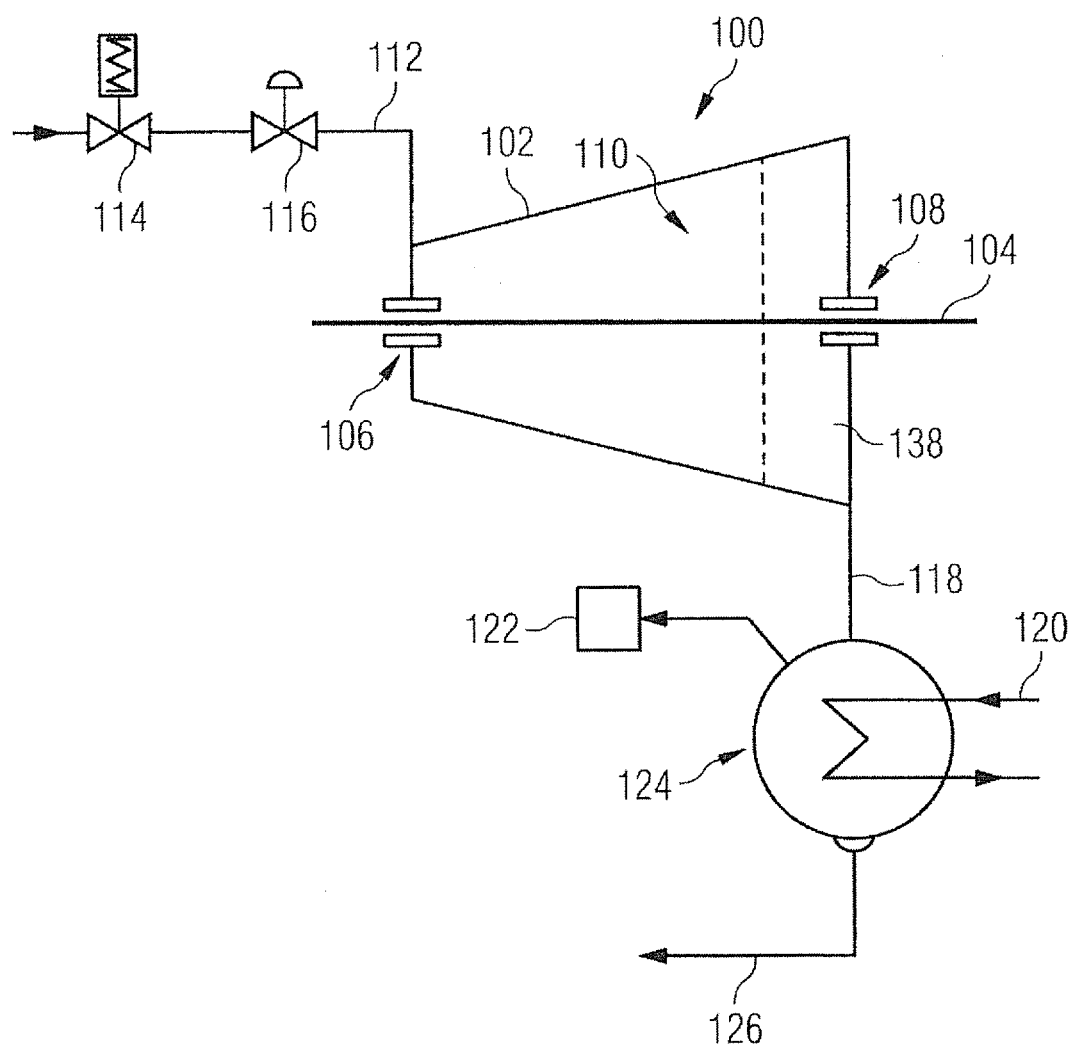
FIG. 1 shows a schematic view, which shows the basic construction of a steam turbine.
Figure 2:
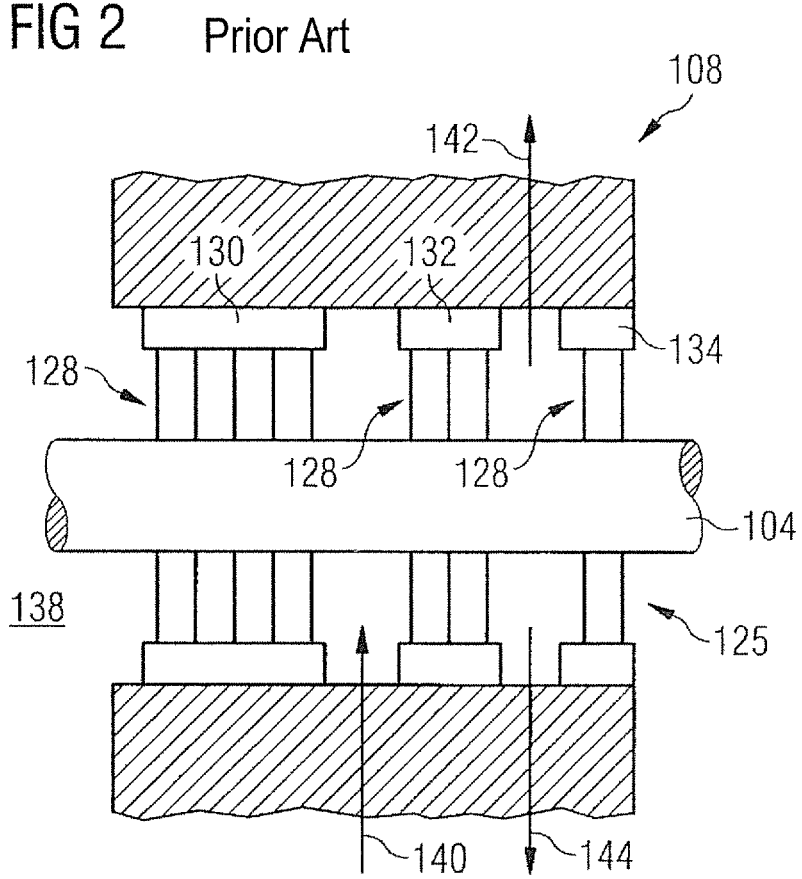
FIG. 2 shows a schematic partial view, which shows a rear seal shell of the machine housing of the steam turbine shown in FIG. 1, wherein the rear seal shell is provided with a conventional shaft seal arrangement.
Figure 3:
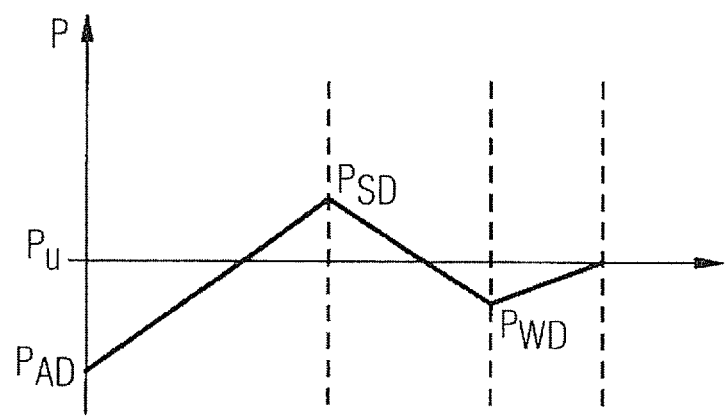
FIG. 3 shows a schematic view, which shows the pressures which prevail inside the conventional shaft seal arrangement shown in FIG. 2.
Figure 4:
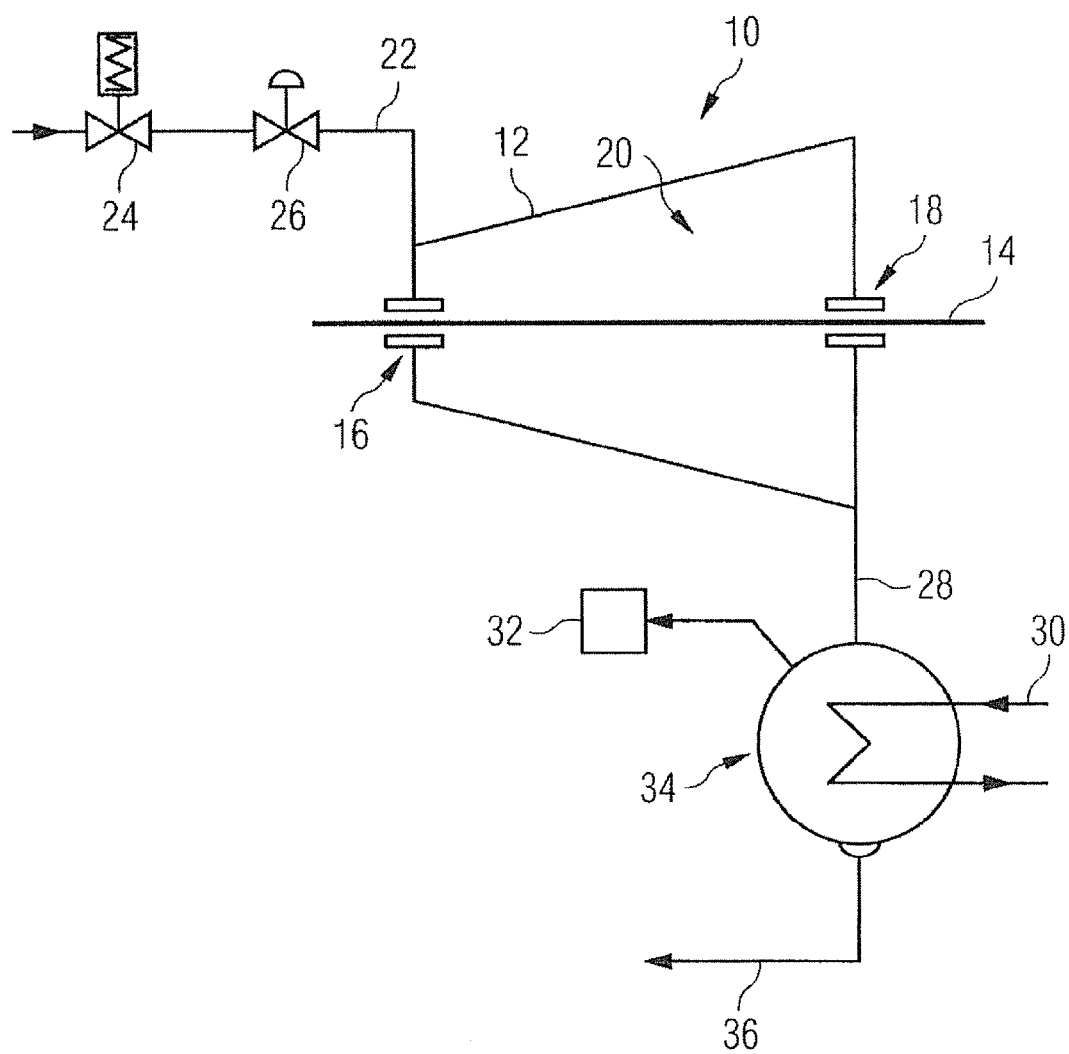
FIG. 4 shows a schematic view of an embodiment of a turbomachine according to the invention in the form of a steam turbine.

FIG. 4 shows a turbomachine according to the invention in the form of a steam turbine 10. The steam turbine 10 comprises a machine housing 12, through which extends a shaft 14 which is guided out of the machine housing 12 on both sides. The machine housing 12 is provided with a front seal shell 16 and with a rear seal shell 18, these undertaking the tasks of sealing the pressure chamber 20, defined inside the machine housing 12, in relation to the machine-housing environment. Live steam is fed to the pressure chamber 20 of the steam turbine 10 via a feed line 22 which is provided with an emergency stop valve 24 and a control valve 26 in series in the throughflow direction. After expansion of the steam in the steam turbine 10, the exhaust steam, via an exhaust line 28, is fed to a condensing plant 34, which is provided with a cooling device 30 and is functionally connected to an evacuation device 32, and is condensed there. The resulting condensate is directed out of the condensing plant 34 via a line 36.

Figure 5:
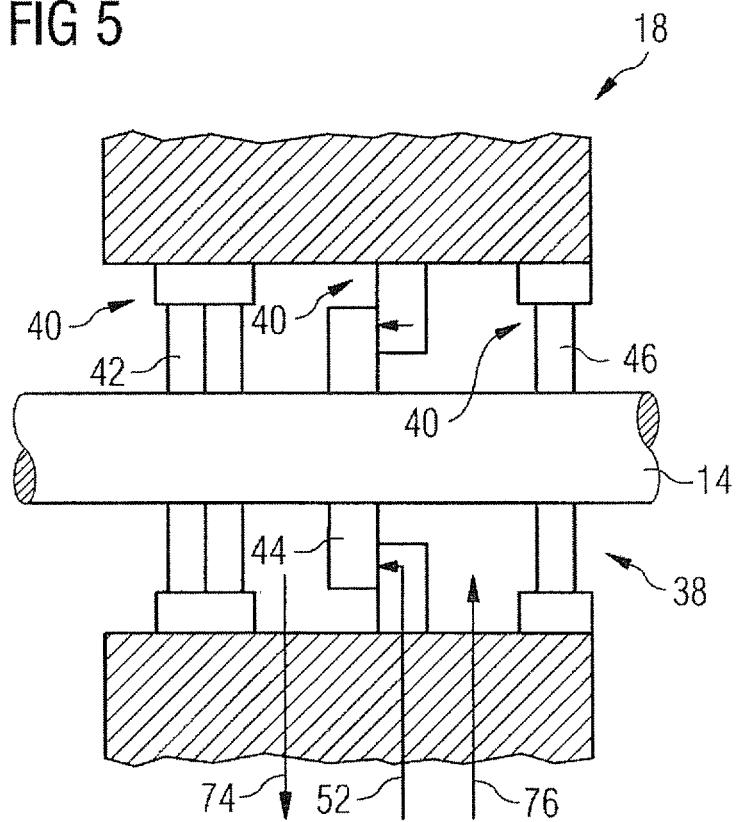
FIG. 5 shows a schematic partial view of a rear seal shell of the machine housing of the steam turbine shown in FIG. 4, wherein the rear seal shell is provided with a shaft seal arrangement according to the invention.

For sealing the annular gap 38 which exists between the shaft 14 and the seal shell 16 or 18, the seal shell 16 or 18, which is installed in the machine housing 12 in a fixed manner and with sealing effect or forms a constructional unit with the machine housing 12, is provided with a shaft seal arrangement 40, as is shown especially in FIG. 5. The shaft seal arrangement 40, starting from the pressure chamber 20, comprises three consecutive sealing modules, specifically an inner labyrinth seal 42, a radial double seal 44 and an outer labyrinth seal 46, which together seal the annular gap 38.

Figure 7:
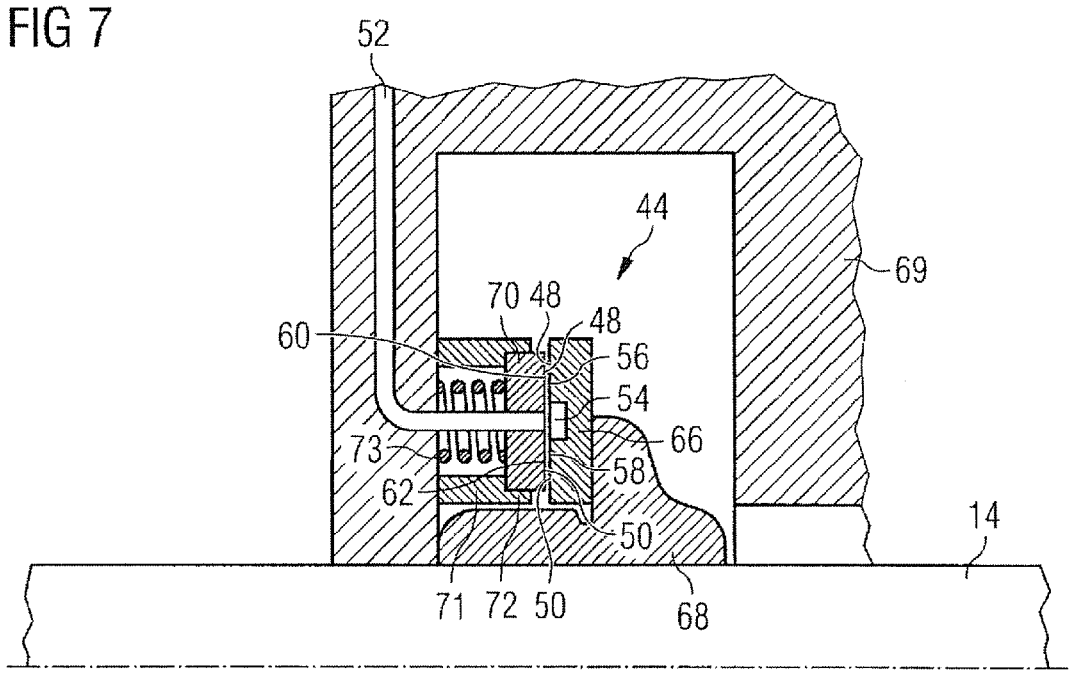
FIG. 7 shows a sectional view of an embodiment of a radial double seal according to the invention of the shaft seal arrangement shown in FIG. 5.

The radial double seal 44, which is shown more accurately in FIG. 7, comprises two essentially radially spaced apart sealing-surface pairs 48 and 50, between which is formed an annular seal-fluid chamber 54 which can be pressurized via a seal-fluid feed line 52. Each sealing-surface pair 48, 50 has an annular rotating sealing surface 56, 58 and an annular non-rotating sealing surface 60, 62 which are arranged essentially axially opposite each other. The rotating sealing surfaces 56, 58 are provided on a rotating sealing-surface carrier 66 which is fixedly connected to the shaft 14 via a hub element 68. The non-rotating sealing surfaces 60 and 62 are provided on a non-rotating sealing-surface carrier 70 which is mounted on a hollow-cylindrical mounting element 71 which is fixedly connected to a seal housing 69 which in turn is fixedly connected to the seal shell 16 or 18 or forms a constructional unit with the seal shell. The mounting element 71, on its ends pointing towards the rotating sealing surfaces 56 and 58, has an annular holder 72 into which the non-rotating sealing-surface carrier 70 can be inserted in an axially slidable manner. Positioned in the interior of the mounting element 71 is a spring element 73 which pretensions the non-rotating sealing-surface carrier 70 against the rotating sealing-surface carrier 66 so that the non-rotating sealing surfaces 60 and 62 are pressed against the corresponding rotating sealing surfaces 56 and 58 coaxially to the shaft 14.

The shaft seal arrangement 40 also comprises a condensate drain line 74, which discharges condensate from the annulus which exists between the inner labyrinth seal 42 and the radial double seal 44, and a separation-fluid feed line 76, which leads to the annulus which exists between the radial double seal 44 and the outer labyrinth seal 46 in order to feed a separation fluid to this annulus.

During operation, the process fluid in the exhaust steam region 78 of the pressure chamber 20 is below an exhaust steam pressure $p_{AD}$ which lies below the machine-housing ambient pressure $p_U$. Between the inner labyrinth seal 42 and the radial double seal 44, accumulating condensate is discharged via the condensate drain line 74. If the exhaust steam is to be sufficiently superheated, then the inner labyrinth seal 42 can possibly be dispensed with. A seal fluid, for example in the form of air or nitrogen with an overpressure $p_{SF1}$, is fed into the radial double seal 44 via the seal-fluid feed line 52 so that an outflow through the two sealing-surface pairs 48 and 50 of the radial double seal 44 is created both inwardly and outwardly. A separation fluid with a pressure $p_{SF2}$ is fed between the radial double seal 44 and the outer labyrinth seal 46 via the separation-fluid feed line 46 and escapes in the direction of the machine-housing environment, blocking any contaminants from outside at the inlet into the shaft seal arrangement 40. The separation fluid, for example, can be the cleaned medium of the environment or an inert fluid such as nitrogen or the like.

Figure 6:
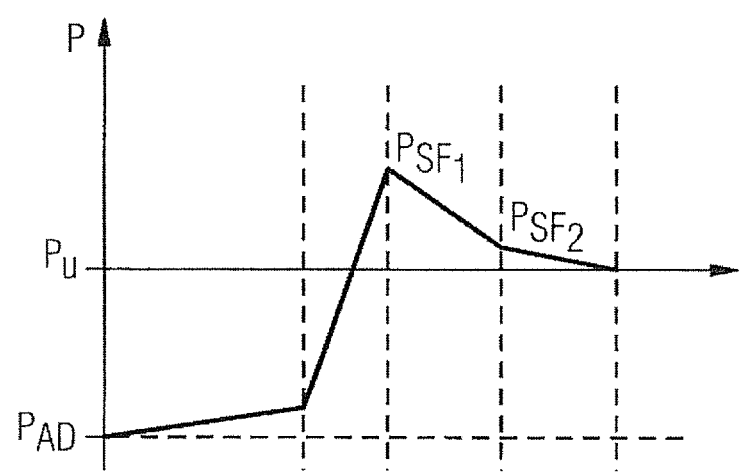
FIG. 6 shows a schematic view which shows the pressures which prevail in the shaft seal arrangement shown in FIG. 5.

As is schematically shown with reference to FIG. 6, the shaft seal arrangement 40 ensures that the pressure $p_{SF1}$ of the seal fluid which is used lies above the other pressures and accordingly a reliable sealing action is continually ensured in an operating state.

The invention claimed is:

1. A steam turbine, comprising:
    a machine housing and a shaft which is guided through and guided out of the machine housing at least on one side;
    an annular gap; and
    a shaft seal arrangement,
    wherein the annular gap, which exists between the shaft and the machine housing, is sealed via the shaft seal arrangement,
    wherein the shaft seal arrangement seals a pressure chamber defined inside the machine housing,
    wherein the shaft seal arrangement comprises a radial double seal with two essentially radially spaced apart sealing-surface pairs, between which is formed an annular seal-fluid chamber which, via a seal-fluid feed line, is pressurized with a gaseous seal fluid under a first pressure in such a way that the radial double seal has a positive pressure difference on both sides at any operating point,
    wherein each sealing-surface pair includes an annular rotating sealing surface and an annular non-rotating sealing surface, which are arranged essentially axially opposite each other and are pretensioned against each other, and
    wherein towards the outside of the machine housing in the axial direction, in relation to the radial double seal, provision is made for an outer additional shaft seal in the machine housing, and an interspace between the radial double seal and the outer additional shaft seal is pressurized with a separation fluid, the second pressure of which is lower than the first pressure of the seal fluid and higher than the ambient pressure, and
    wherein towards the inside of the machine housing in the axial direction, in relation to the radial double seal, provision is made for an inner additional shaft seal.

2. The steam turbine as claimed in claim 1, wherein the non-rotating sealing surfaces are provided on a common non-rotating sealing-surface carrier and in that the rotating sealing surfaces are provided on a common rotating sealing-surface carrier.

3. The steam turbine as claimed in claim 1, wherein the non-rotating sealing surfaces are provided on a common non-rotating sealing-surface carrier or the rotating sealing surfaces are provided on a common rotating sealing-surface carrier.

4. The steam turbine as claimed in claim 2, wherein the non-rotating sealing surfaces are pretensioned via a spring force in the direction of the rotating sealing surfaces.

5. The steam turbine as claimed in claim 3, wherein the non-rotating sealing surfaces are pretensioned via a spring force in the direction of the rotating sealing surfaces.

6. The steam turbine as claimed in claim 1, wherein the sealing-surface pairs are arranged coaxially to the shaft.

7. The steam turbine as claimed in claim 1, wherein provision is made for a fluid drain line.

8. The steam turbine as claimed in claim 7, wherein the fluid drain line is disposed between the inner additional shaft seal and the radial double seal.

\* \* \* \* \*